(12) United States Patent
Lim et al.

(10) Patent No.: US 7,155,737 B1
(45) Date of Patent: Dec. 26, 2006

(54) INTEGRATING USER SPECIFIED EXTENSIONS INTO AN INFORMATION ACCESS SYSTEM

(75) Inventors: Mario Lim, South San Francisco, CA (US); Teresa Win, Sunnyvale, CA (US); Emilio Belmonte, Seville (ES)

(73) Assignee: Entrust, Inc., Plano, TX (US)

( * ) Notice: Subject to any disclaimer, the term of this patent is extended or adjusted under 35 U.S.C. 154(b) by 0 days.

(21) Appl. No.: 09/309,360

(22) Filed: May 11, 1999

(51) Int. Cl.
*G06F 12/02* (2006.01)
*G06F 13/28* (2006.01)
*H04L 9/00* (2006.01)
*G06F 15/173* (2006.01)

(52) U.S. Cl. ............ 726/2; 713/155; 713/162; 713/165; 713/166; 713/167; 713/176; 713/179; 713/180; 726/1; 726/3; 709/223; 709/224; 709/225; 709/226; 709/229

(58) Field of Classification Search ........ 713/200–202, 713/182, 166, 167; 709/223–229; 726/2
See application file for complete search history.

(56) References Cited

U.S. PATENT DOCUMENTS 5,781,724 A * 7/1998 Nevarez et al. ............... 726/17

OTHER PUBLICATIONS

Heller, 1996, Windows Magazine, n 708, PG257.*

* cited by examiner

Primary Examiner—Ayaz Sheikh
Assistant Examiner—Jenise E. Jackson
(74) Attorney, Agent, or Firm—Kirk D. Wong; Marcel K. Bingham; Hickman Palermo Truong & Becker LLP

(57) ABSTRACT

A method and apparatus is provided for securely executing access control functions that may be customized by or on behalf of administrators of information access systems. Examples of such functions include changing a password of a user, determining whether or not data specifying a user and a password identifies an authentic user, and displaying a message indicating whether a login attempt was successful. An access control function is mapped to a digital signature. The digital signature is used to verify that an executable element retrieved for executing the access control function is the proper executable element. The access control functions may be invoked upon the occurrence of access control events, such as a user successfully logging onto an information access system or the modification of a user's password. A mapping contains data used to determine what events are tied to what access control functions, and whether the access control function should be executed. Upon the occurrence of an extension event that is tied to an extension, an executable element for the extension is retrieved. After executing an extension, data is returned to the caller of the extension. The returned data may be a hash table that includes other objects, such as strings or even other hash tables. The access control functions are developed in manner that exploits the power and simplicity of the inheritance feature of object oriented programming.

30 Claims, 11 Drawing Sheets

INTEGRATING USER SPECIFIED EXTENSIONS INTO AN INFORMATION ACCESS SYSTEM

FIELD OF THE INVENTION

This invention generally relates to methods of controlling access to protected information resources in a network environment. The invention relates more specifically to methods, apparatus, and products for integrating extensions into a system that provides secure and selective access to network resources based on a role of a user of the resources.

BACKGROUND OF THE INVENTION

Computer networks have become ubiquitous in business, industry, and education. Networks have one or more resources, such as application programs that provide various computing functions, which are available to all users. Organizations that operate networks are referred to as network operators.

Development of the globally accessible, packet-switched network known as the Internet has enabled network resources to become available worldwide. Development of hypertext protocols that implement the World Wide Web ("the Web") enables networks to serve as a platform for global electronic commerce. In particular, through the Web a business easily exchanges information with its customers, suppliers and partners worldwide. Because some exchanged information is valuable and sensitive, access to it should be limited to selected users. Thus, there is a need to provide selective access to network resources and information over the Web.

One approach to solve the foregoing problems is to provide each network resource or application program with an access control mechanism. Typically, the access control mechanism is commercial software, which is purchased as off-the-shelf software from vendors of access control mechanisms.

Commercial access control mechanisms have several advantages. First, they are developed by developers that specialize in network security. Second, businesses operating networks may purchase commercial access control mechanisms at a price much less than the cost of producing comparable software in house.

Vendors of commercial access control mechanisms develop access control functionality demanded by network operators. The functionality demanded varies between network operators. One approach to providing functionality that meets the varying demands is to incorporate, into the access control mechanisms, configuration mechanisms that enable network operators to customize security functions.

For example, access control mechanisms often request a valid password from a user who is requesting access to the network that is protected by the access control mechanism. Some network operators may desire that the password contain a relatively small number of characters, while other network operators may prefer more secure passwords, such as passwords that contain relatively larger number of characters that include both alpha and numeric characters. To meet the functionality desired by both groups of network operators, access control mechanisms may provide a configuration mechanism that enables network administers to specify the format of passwords.

Some security functionality is demanded by a relatively large subset of network operators, while other functionality is demanded by a relatively small subset of network operators. Vendors of access control mechanisms are more likely to develop the more heavily demanded functionality, and less likely to develop the less demanded functionality. Less demanded functionality is less economical for vendors to develop, and consequently, less likely to be offered commercially. Therefore there is a need for a mechanism that provides functionality that is less demanded or special to a particular set of network operators.

One approach to providing specialized functionality is the "external call" approach. Under the external call approach, the access control mechanism has an external call mechanism that invokes, under particular circumstances, software supplied by network operators themselves. This approach enables network operators to tailor commercial access control software to provide desired functionality.

For example, an external call mechanism may call a routine supplied by a network operator. The routine is called while logging in a user, after the user has supplied a valid password, but before access to the network is granted to the user. The access control mechanism expects the routine to return data that indicates whether or not access should be granted. When invoked, the routine accesses via the internet a service that verifies whether or not the user is a terminated employee of the network operator, and returns data that indicates whether access should be denied when the user is a terminated employee.

The external call approach, however, leaves network operators vulnerable to those who may maliciously alter externally invoked software, thereby circumventing the access control mechanism and exposing network resources. There is therefore a need to prevent the access control system from calling external call routines that have been altered maliciously or otherwise.

SUMMARY OF THE INVENTION

A method and apparatus is described for securely executing access control functions that may be customized by or on behalf of administrators of information access systems. Examples of such functions include changing a password of a user, determining whether or not data specifying a user and a password identifies an authentic user, and displaying a message indicating whether a login attempt was successful.

According to an aspect of the present invention, an access control function is mapped to a digital signature. The digital signature is used to verify that an executable element retrieved for executing the access control function is the proper executable element.

According to another aspect of the present invention, the access control functions may be invoked upon the occurrence of access control events. Examples of access control events are a user successfully logging onto an information access system or the modification of a user's password. A mapping contains data used to determine what events are tied to what access control functions, and whether the access control function should be executed. Upon the occurrence of an access control event that is tied to an extension, an executable element for the extension is retrieved. After executing an extension, data is returned to the caller of the extension. The returned data may be a hash table that includes other objects, such as strings or even other hash tables.

According to another aspect of the invention, the access control functions are developed in manner that exploits the power and simplicity of the inheritance feature of object oriented programming. Specifically, a superclass is established from which access control functions in the form of subclasses may be created. Subclasses of the superclass inherit the methods and attributes of the superclass.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Figure 1:
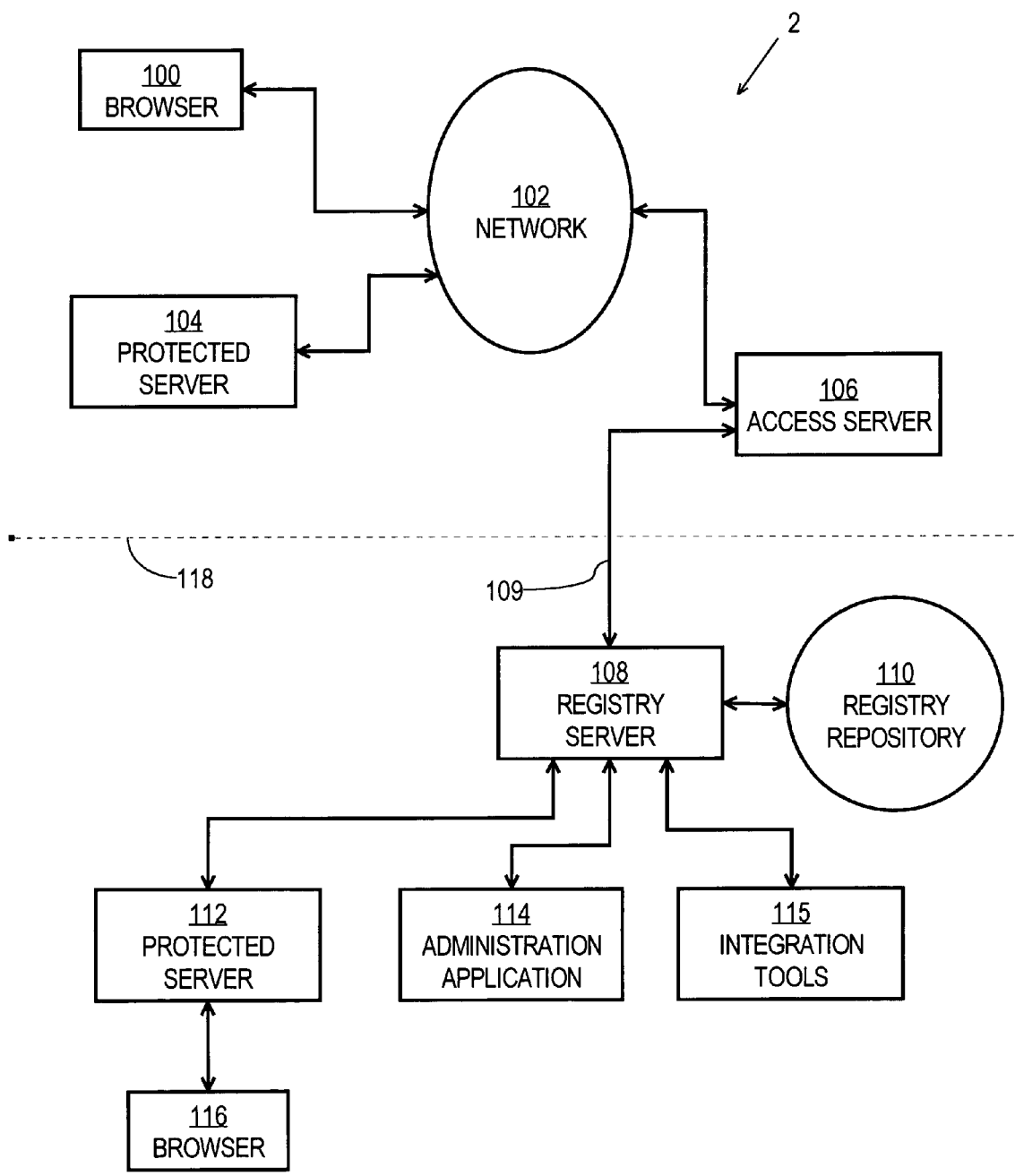
FIG. 1 is a block diagram of an information access system.

A method and apparatus for controlling access to protected information resources is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

A technique is described for securely executing customized access control functions implemented by administrators of information access systems. An access control function is software that performs functions related to managing access to resources on a network. Examples of such functions include changing a password of a user, determining whether or not data specifying a user and a password identifies an authentic user, and displaying a message indicating whether a login attempt was successful. Customized access control functions written by or for administrators of an information access system are referred to as extensions.

Extensions are developed in manner that exploits the power and simplicity of the inheritance feature of object oriented programming. Specifically, a superclass is established from which extensions in the form of subclasses may be created. Extensions that belong to subclasses of the superclass inherit the methods and attributes of the superclass.

Extensions may be invoked upon the occurrence of access control events, which are key events related to controlling access to information resources on a computer system. Examples of access control events are a user successfully logging onto an information access system or the modification of a user's password. Access control events for which an extension may be called are referred to extension events.

A Hook Configuration Mapping contains data that specifies which access control events are extension events, whether "extension invocation" is active for the extension event, and the one or more extensions tied to the extension event. When extension invocation is active for an extension event, the one or more extensions tied to the extension event will be invoked upon the occurrence of the extension event that is tied to the extensions. For each extension tied to an extension event, the data may specify whether extension invocation is active for the extension, the order of execution of the extension, and a signature for the extension. The signature uniquely identifies the contents of the element to a substantial degree of certainty. A Hook Configuration Mapping may be configured by, for example, system administrators to tie extensions to extension events, and to activate or inactivate extension invocation for a particular extension event.

Upon the occurrence of an extension event for which extension invocation is active, an executable element for each of the mapped extensions is retrieved. When each extension element is retrieved, a signature for the executable element is generated. The signature of the just retrieved executable element is compared to the signature mapped to the extension by the Hook Configuration Mapping. If the signatures match, then the executable element is executed.

After executing an extension, data is returned to the caller of the extension. The returned data may be a hash table that includes other objects, such as strings or even other hash tables.

By developing extensions, an access information system may be tailored to suit the individual needs and desires of organizations using the access information system. Extensions may developed to provide desired custom functionality. To ensure that the proper code element for an extension is loaded for execution, a signature generated for the code element is used to determine that the code element is the intended code to execute. The security of the protected computer system may not be comprised surreptitiously by altering extensions. In this manner, the security of the code and the computer system protected by the access information system are enhanced.

Overview of Access Control System

Extensions are called by an information access system when it detects the occurrence of extension events. It is therefore useful to describe an exemplary information access system, how its components and processes operate to not only secure information resources, but to detect the occurrence of extension events and to initiate the steps for executing the proper extensions.

FIG. 1 is a block diagram of the main elements of an information access system 2 with which an embodiment of the present invention operates. Generally, an information access system 2 comprises a plurality of components including an Access Server 106, Registry Server 108, Administration Application 114, and Integration Tools 115. The foregoing components cooperate to control access to resources stored on one or more Protected Servers 104 and 112. A Protected Server may be a Web server. Each component comprises one or more modules. Each module provides one or more services to users of the system 2 and administrators. There may be any number of Protected Servers 104. Users are individuals who have a relationship with an organization and play various roles, and are registered in the system 2. Users may be members of an organization, or may be customers, suppliers, or business partners of the organization. Administrators control the system.

A browser 100 is coupled by a communication link to a network 102. The block shown for browser 100 represents a terminal, workstation computer, or an equivalent that executes a standard Web browser program or an equivalent, such as Netscape Navigator, Internet Explorer, or NCSA Mosaic. Network 102 is a compatible information communication network, preferably the Internet. In alternate embodiments, the browser 100 is a client process or client workstation of any convenient type, and the network 102 is a data communication network that can transfer information between the client and a server that is also coupled to the network.

The system 2 enables organizations to register information sources or Resources and register Users of the information in a central repository. A Resource is a source of information, identified by a Resource ID and a Uniform Resource Locator (URL), and published by a Web server either in a static file formatted using Hypertext Markup Language (HTML) or in a dynamically generated page created by a CGI-based program. Examples of resources include a Web page, a complete Web site, a Web-enabled database, and an applet.

The Registry Server 108 is coupled to a Registry Repository 110 that stores information about users and resources. Registry Server 108 is coupled by a secure communication link 109 to Access Server 106, which is coupled to network 102. Registry Server 108 has an Authentication Server Module that manages concurrent access of multiple users or browser 100 to Registry Repository 110. Registry Repository 110 is structured as a database. For example, the Registry Repository may be an SQL Server relational database management system, the Oracle7® database, etc. The Registry Server also contains an Access Control Library that is structured as a Java library.

An Access Control Library ("ACL") is used to make remote procedure calls to Registry Server 108. The Access Control Library also includes a Public API that enables application programmers or developers to customize system 2. For example, in the preferred embodiment, the ACL exports Java® classes called UserResourceMenu and UserAPI, which may be used by developers to provide several services.

The system 2 enables administrators to implement access rules by defining resource profiles or user profiles. System 2 automatically links a user profile to the resource profiles of the resources a user may access.

The system 2 enables Users to log-in to the system once, and thereafter access one or more Resources during an authenticated session. Users may log in either with a digital certificate or by opening a login page URL with a Web browser and entering a name and password. In the past, users have had to log in individually to each Web application that they are authorized to use. In the preferred embodiment, users always access the same login page regardless of the number of resources to which they need access. Thus, the system provides a mechanism of single secure log-in to Web resources. If the login attempt is successful, the system 2 presents the User with a Personalized Menu that assists the User in identifying and selecting a Resource.

Administration Application 114 contains Administration Application Modules, a Runtime Module, and an Access Control Library. The Administration Application Modules are structured as one or more HTML pages, CGI-based Java programs, or applets. The Runtime Module is structured as a C/C++ web server plug-in.

A Protected Server 112 is coupled to Registry Server 108. The Protected Server 112 executes or supervises execution of an Administration Application 114, which functions to register and manage users and resources by reading and writing information to or from Registry Repository 110.

Integration Tools 115 includes source code, templates, and utilities which may be used by developers to customize and integrate system 2. Integration Tools 115 shall be explained in greater detail later. The Access Server 106 is a server that authenticates users of the access system 2.

Protected Server

When the user selects a resource, the browser sends an open URL request and cookie to a Protected Web Server. A Protected Web Server is a Web server with resources protected by the Runtime Module. The Runtime Module decrypts information in the cookie and uses it to verify that the user is authorized to access the resource. The cookie is also used by the resource to return information that is customized for the user.

Figure 2:
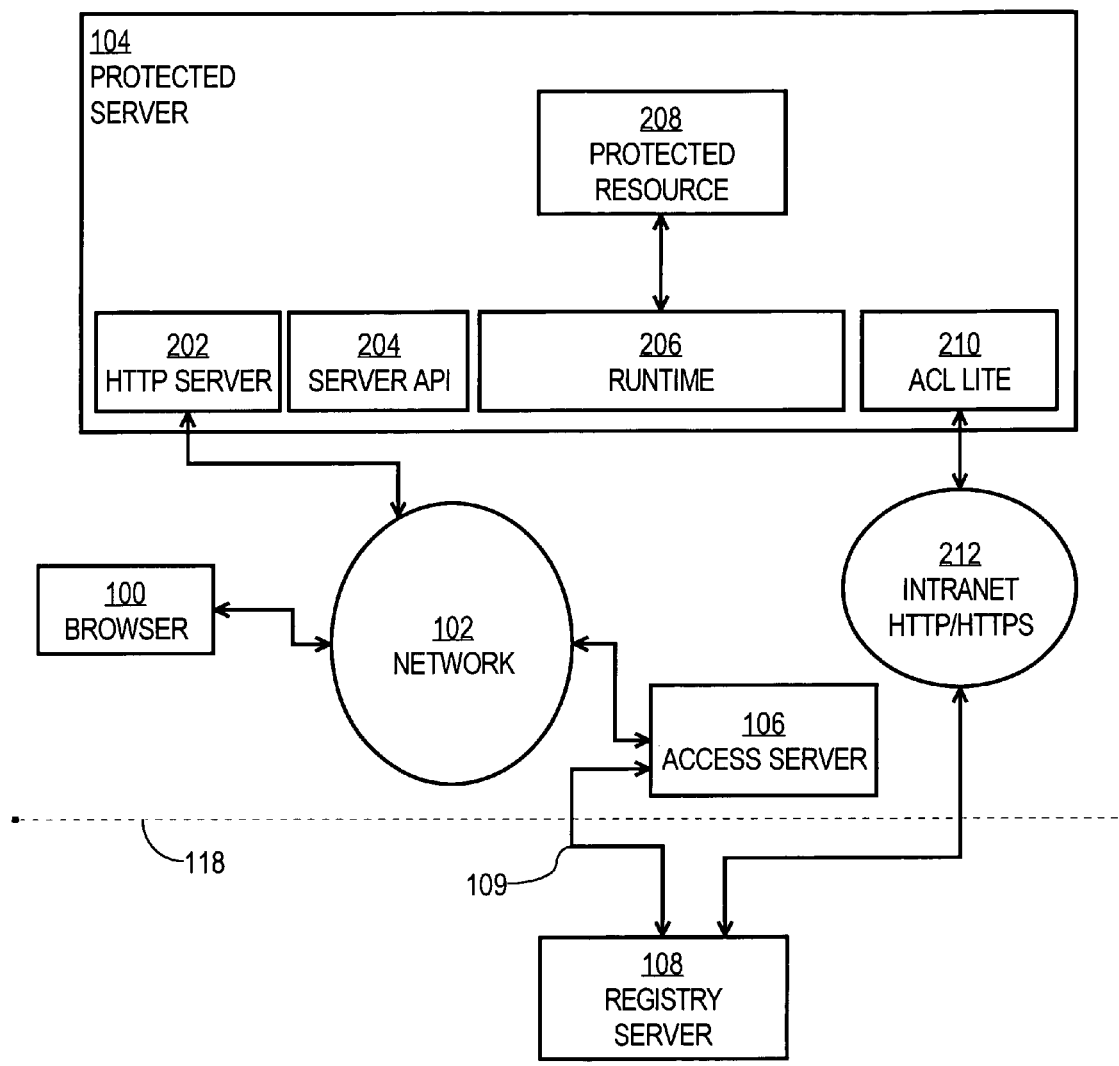
FIG. 2 is a block diagram of a protected server and its connections to the system of FIG. 1.

FIG. 2 shows a Protected Web Server according to an embodiment of the present invention. Protected Servers 104 preferably are World Wide Web servers that store one or more protected resources 208 that are protected by a Runtime Module 206. In the preferred embodiment, Runtime Module 206 provides one or more functional services. For example, the Runtime Module 206 functions to provide a Remote Configuration Service, an Authentication Verification Service, and an Authorization Verification Service. Each service is structured as a C/C++ Web server plug-in.

The Access Control Library 210 provides access to the Registry Server 108. The Protected Server 104 executes an HTTP Server 202, which sends and receives requests or messages conforming to the Hypertext Transfer Protocol (HTTP). An example of the HTTP Server 202 is the public domain Apache Web server.

To associate a Protected Server 104 with system 2, the Administration Application 114 is used to enter information about the Protected Server. The information is stored in the Registry Repository 110.

Integration Tools

Figure 3:
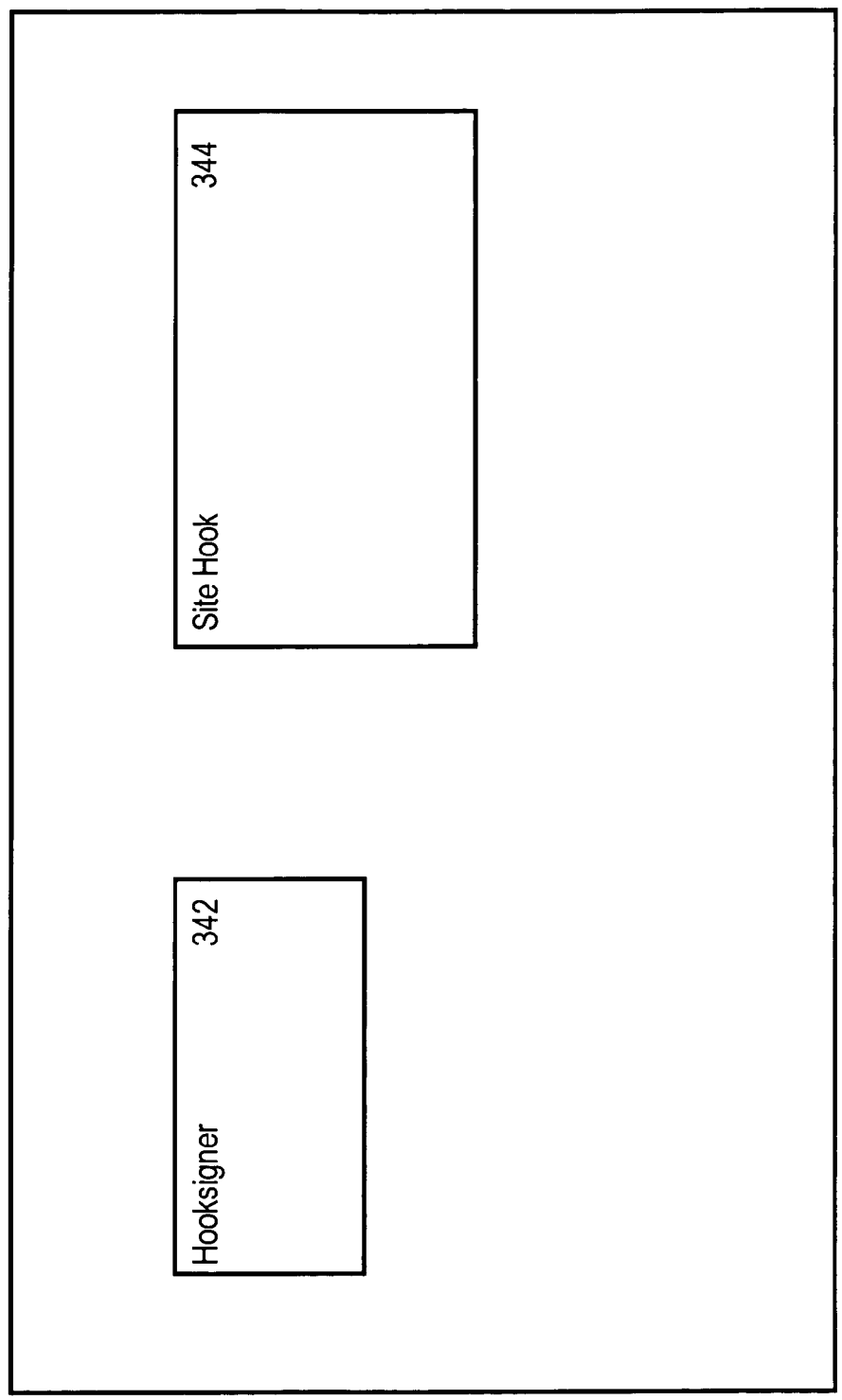
FIG. 3 is block diagram depicting Integration Tools.

FIG. 3 depicts Integration Tools 115 in greater detail according to an embodiment of the present invention. Integration Tools 115 includes source code, templates, and utilities which may be used by developers to customize and integrate system 2. Integration tools 115 may include a signature generator HookSigner 342, and an abstract class SiteHook 344, which may be used by developers to develop extensions in the form of subclasses of SiteHook 344.

Access Server/Detecting Extension Events

Figure 4:
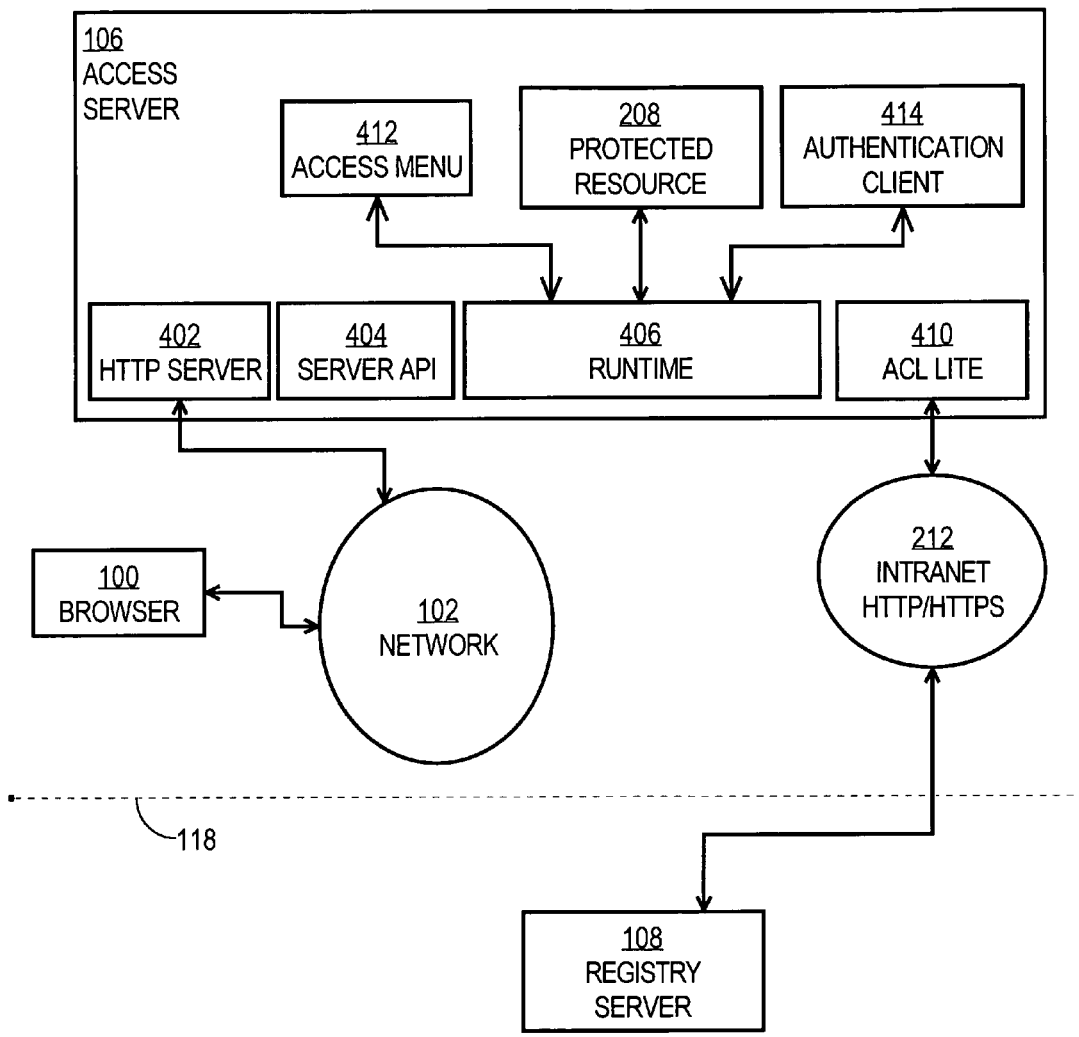
FIG. 4 is a block diagram of an access server used in the system of FIG. 1.

FIG. 4 is a block diagram of exemplary Access Server 106. Processes performed by Access Server 106 are used to illustrate the process of detecting the occurrence of extension events and securely invoking extensions. In an embodiment of the present invention, Access Server 106 is a Web server that authenticates users of the access system 2. Access Server 106 comprises an HTTP Server 402, Server Application Programming Interface (API) 404, an Authentication Client Module 414, Access Menu Module 412, Runtime Module 406, and Access Control Library 410.

Access Server 106 stores a log-in page which is used to receive data specifying a user name and a password. The Authentication Client Module 414 authenticates a user by verifying the name and password with the Registry Server 108.

Once a user has been authenticated, the Access Menu Module of the Access Server returns a Personalized Menu of the type described above.

HTTP Server 402 sends and receives messages and requests that conform to the HTTP protocol. Server API 404 enables external programs and processes to access functions of HTTP Server 402. The Authentication Client Module 414 functions to provide an Authentication Service, Login Tracking Service, Profile Management Service, Authorization Service, and Logout Service. Each service is structured as one or more HTML pages, or CGI-based Java programs. The Access Menu Module 412 provides a Personalized Menu Service. It is also structured as one or more HTML pages or CGI-based Java® programs. The Access Control Library 410 protects system resources and provides access to the Registry Server.

The Authentication Client Module 414 enables users to begin and end authenticated sessions and change their account profiles. The Authentication Service of Authentication Client Module 414 is invoked when a user opens the login page URL of system 2. The Authentication Service is also invoked when a user tries to access a protected resource 208 without first logging in.

Figure 5A:
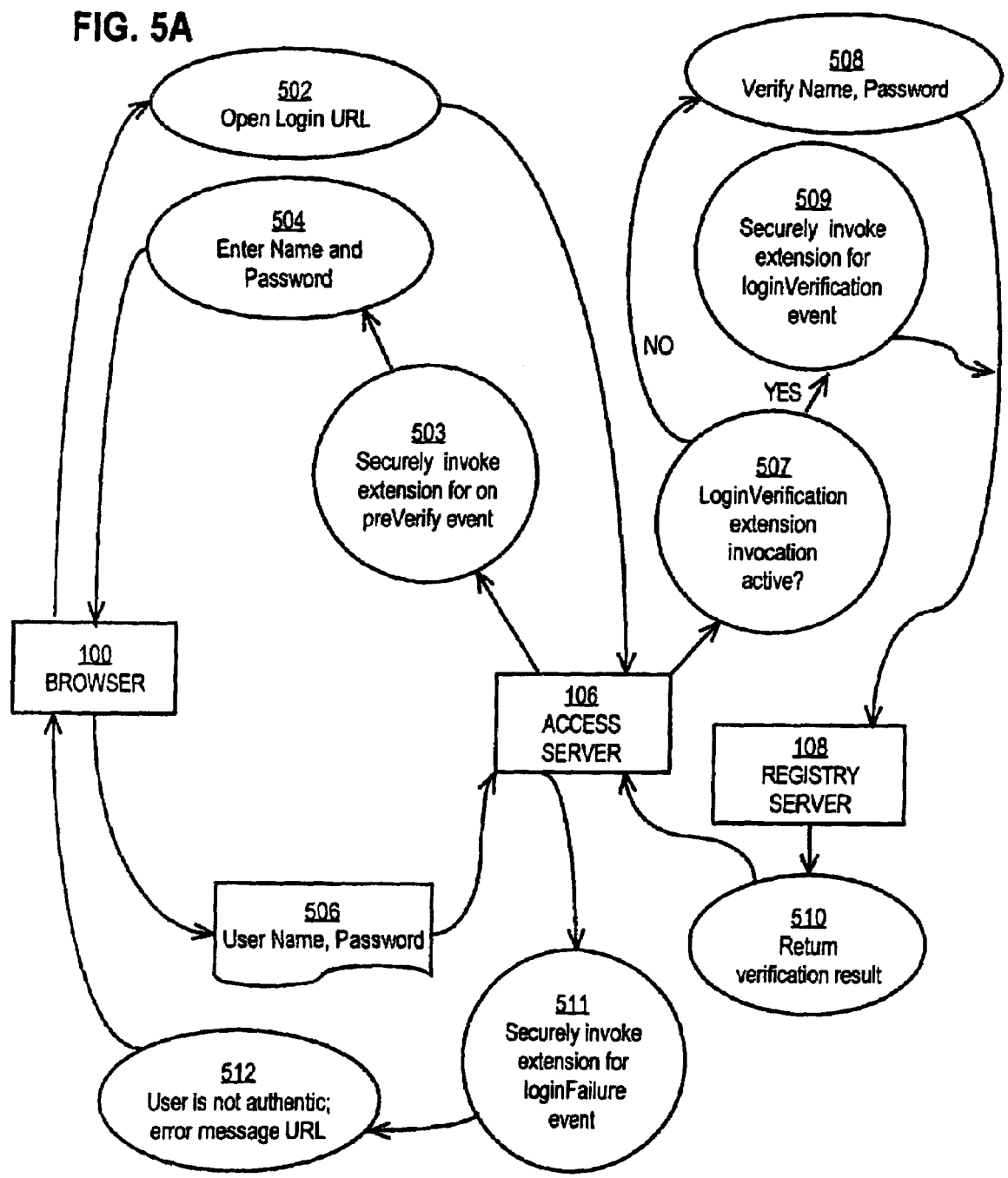
FIG. 5A is a state diagram showing steps carried out in a user verification process.

FIG. 5A is a state diagram of steps carried out by Access Server 106 in an embodiment of the present invention. As shown by state 502, browser 100 opens the URL of a login page. In response, as shown by state 503, access server 106 may securely invoke the extensions for an extension event, such as the preVerify event. The steps for securely invoking an extension shall be explained in greater detail. The login page prompts the user for a name and password, as shown in state 504.

The user enters the name and password into the login page using browser 100, which provides the name and password to Access Server 106. As shown by state 507, Access server 106 determines whether the loginVerification event is an extension event and whether extension invocation is active for the event, in a manner which shall be described in further detail. If extension invocation is active, then, as indicated by state 509, the extension for the loginVerification event is securely invoked. Otherwise, as indicated by state 508, access server 106 requests that Registry Server 108 verify whether the user is authentic. A user is considered authenticated if the name and password match information stored in the Registry Repository 110. The Registry Server 108 returns the result of the verification step to Access Server 106, as shown by state 510.

Next, the access server securely invokes an extension for the login failure event as shown by state 511, if the login failure event is an extension event. If the name and password cannot be authenticated or the account is marked inactive, then as shown by state 512, Access Server 106 returns an error message to browser 100.

Figure 5B:
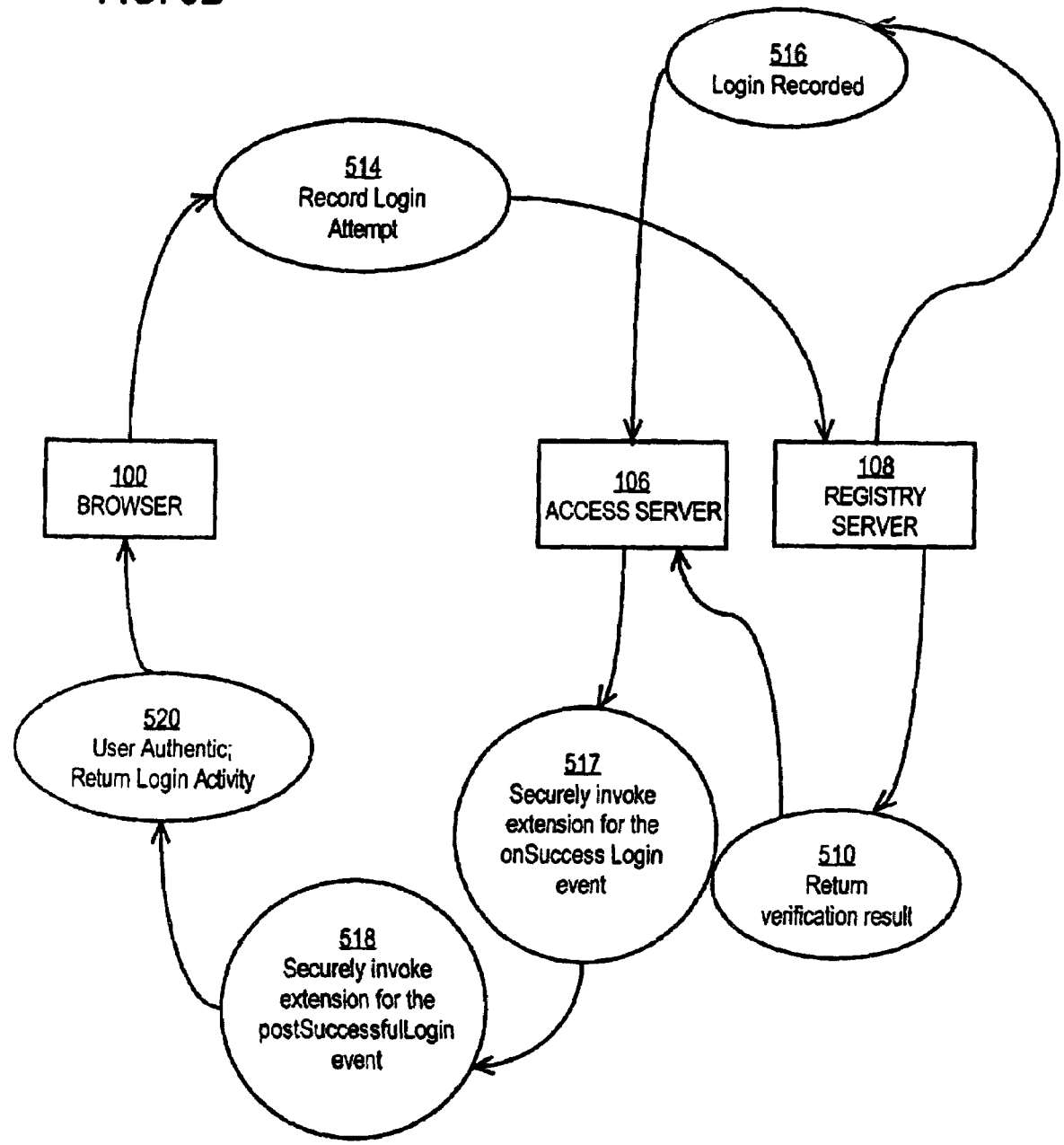
FIG. 5B is a state diagram showing steps carried out in a login process.

FIG. 5B is a state diagram showing steps carried out in the Login Tracking Service. After Registry Server 108 returns the result of verifying the user's name and password at state 510, Access Server 106 requests Registry Server 108 to record a login attempt, as shown in state 514. In state 516, Registry Server 108 informs Access Server 106 that a login attempt has been recorded in persistent storage in Registry Server 108. If the user is an authenticated user, then as shown in state 517 the Access Server 106 may securely invoke an extension for the on SuccessLogin event, if the event is an extension event. Next, as shown by state 518, the extension for the postSuccessfulLogin event is invoked, if the event is an extension event. Next, as shown in state 520, the date and time of the user's last successful and unsuccessful login are returned by Access Server 106 to browser 100, which may display the date and time information.

Figure 5C:
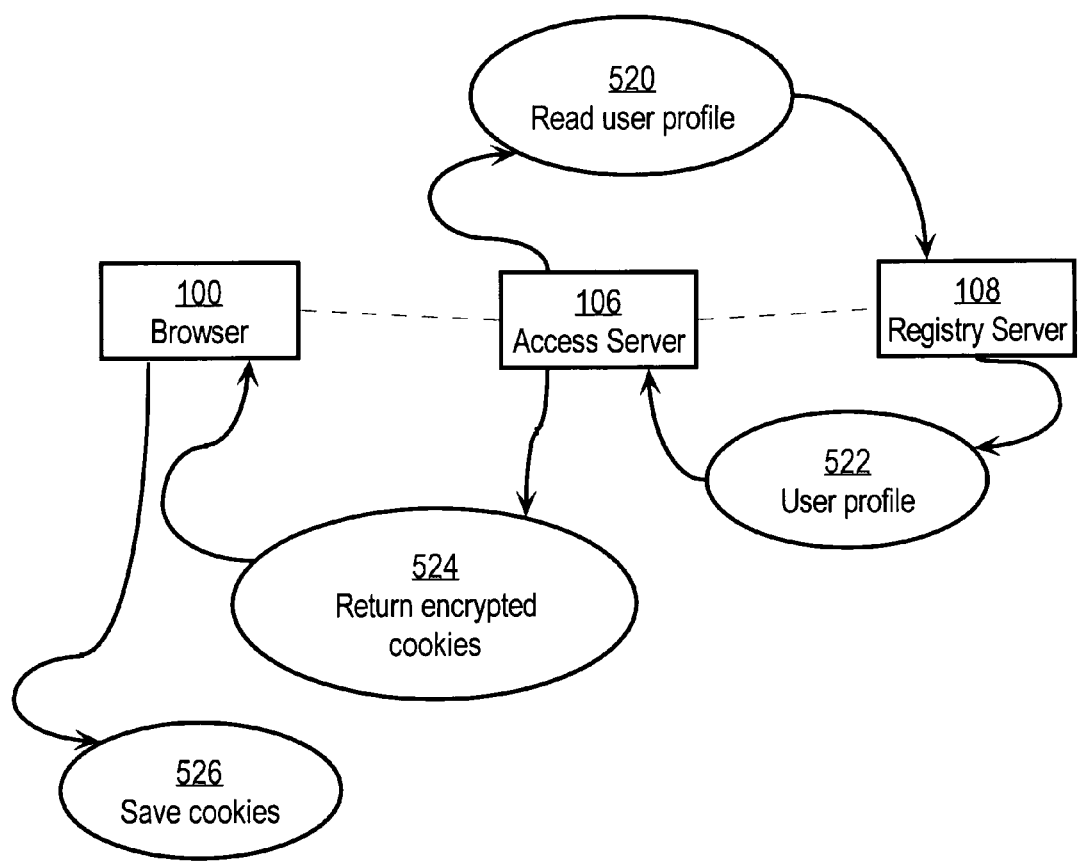
FIG. 5C is a state diagram showing steps carried out in generating user profile information.

FIG. 5C is a state diagram of actions taken by the browser, Registry Server 108, and Access Server 106 after a user is authenticated. The Authentication Client module 414 requests the user's profile from the Registry Server 108, as shown by state 521. The profile information may comprise the user's name, locale information, IP address, and information defining what resources may be accessed by the user. In state 522, Registry Server 108 returns the profile information to Authentication Client Module 414. At state 524, Authentication Client Module 414 then encrypts and sends this information to browser 100, for example, in a cookie.

A "cookie" is a packet of data sent by web servers to web browsers. Each cookie is saved by browser 100 until the cookie expires. A cookie returned by the Authentication Client Module is required for access to resources protected by the system 2.

Other Extension Events

The extension events described herein are expository. While these expository extension events occur while authenticating a user, extension events may occur while performing other types of functions or processes. For example, an extension event can be the modification of a password, the connection of a user to a protected server, or a user logging off. Appendix One shows examples of access control events which may be used as extension events. It should be understood that the present invention is not limited to any particular set of extension events.

Extension Implementations

Before an extension may be invoked, it must be developed. According to an embodiment, extensions may be developed, in an object-oriented programming language, as subclasses that inherit from an abstract class.

Referring to FIG. 3, an abstract class SiteHook 344 defines a variety of methods which are inherited by a subclass of SiteHook 344. A description of some of these methods follows. In order to operate properly, a subclass of SiteHook 344 calls the constructor of its parent, which may be SiteHook 344 or a subclass of SiteHook 344. In addition, for some of methods defined for SiteHook 344, the developer supplies an implementation, as indicated below by the following description of methods.

action—An implementation must be provided for this method. The implementation should provide functionality desired for the extension. For example, if an extension is called to generate a login failure message, then the login failure message is generated by calling the action method.

getParamValue—This method returns a value for the parameter passed by the caller. For example, the code getParamValue("username") returns a string representing the user name. Appendix One shows for various access control events an illustrative set of parameters available through getParamValue.

setRetValues—This method is invoked to collect return values that are returned to the caller of the extension. In one embodiment of the present invention, a key name and object, such as string or a hash table, are passed in as parameters when calling the setRetValues method. A key name and the data identified by it are referred to as a name-value pair. The name-value pair is stored in a hash table, where the name is used as a key to the hash table. The hash table is returned to the caller of the extension. The following is an example of code invoking setRetValues to collect return values.

setRetValue ("EXAMPLE_KEY", exampleHashTable)

"EXAMPLE_KEY" is a string, and exampleHashTable is a reference to a hash table object. Classes defining hash tables are available in standard libraries. When setRetValue is invoked, it stores the hash table referenced by exampleHashTable in a hash table used to collect return values, becoming in effect a hash table within a hash table. The referenced hash table is associated with the key string "EXAMPLE_KEY".

removeRetValue—This method is invoked to delete a value from the set of values returned to the caller of an extension. In one embodiment of the present invention, a key name is passed as a parameter when calling the removeRetValue method. The key name passed in specifies the name-value pair to delete from the hash used to collect return values.

getRetValue—This method is invoked to get return values generated by an extension. The values returned are those collected through one or more invocations or setRetValues.

Values Returned by Extensions

When a caller calls an extension, the extension returns a set of values. The caller then handles the set of values the caller is designed to handle. In an embodiment of the present invention, an extension returns a hash table containing objects. The contained objects may be strings, hash tables, or other types of objects. A caller expects a hash table that may contain the following hash tables or strings, each of which shall be explained in greater detail:
COOKIES;
SECURE_COOKIES;
SPECIALIZED_FIELDS; and
HOOKCOMM Cookies This hash table contains name-value pairs of information to be stored in the user's browser. For example:

| Name (Hashtable Key) | Value (Hashtable Value) |
|---|---|
| SSN | 123456789 |
| SECRET_PHRASE | Hello world!!! |
| COMPANY | enCommerce, Inc. |
| ACCOUNT_ID | 7575 |

The Access Server sends each key's name-value pair to the browser, for example, as a cookie. All Resources can then get these extra cookies from a HTTP_COOKIE environment variable.

Secure_Cookies

This hash table also contains name-value pairs of information that the Access Server 106 sends to the user's browser as cookies. However, these cookies are more secure. Only the on SuccessLogin event returns SECURE_COOKIES. The extension returns a hash table that contains keys named by Resource IDs. The keys are associated with hash table values that may themselves include name-value pairs separated by commas. For example:

| Resource ID (Hashtable Key) | Name-Value Pair (Hashtable Value) |
|---|---|
| resid1 | SSN = 123563785, COLOR = red |
| resid2 | FOOD = pasta, FRUIT = banana |
| Scglobal | LANGUAGE = english |

The key names correspond to the Resource IDs entered in the Administration application during Resource creation. Commas separate name-value pairs. The Runtime decrypts secure cookies and looks for a match between their component Resource IDs and the Resources the users want to access. When the Runtime finds a match, it loads the name-value pairs for that Resource ID into HTTP_SC environment variables. The variables generated for resid1 key from the table above may be, for example,
HTTP_SCSSN=123563785
HTTP_SCCOLOR=red
HTTP_SCLANGUAGE=english Specialized_Fields This hash table contains specific fields returned by an extension for a particular extension event. Here is an example.

| Name (Hashtable Key) | Value (Hashtable Value) |
|---|---|
| GETACCESSUSERNAME | Existing getAccess username websecadm |
| MESSAGE | Specific message Password expires in 1 day |
| URL URL | string http://ourcompany.com |
| SKIPGETACCESSADDCERT | String, value true or false |
| SKIPGETACCESSAUTH | String, value true or false |
| SKIPGETACCESSDELETECERT | String, value true or false |
| SKIPGETACCESSPASSWORD | String, value true or false |
| SKIPGETACCESSPROFILING | String, value true or false |

It is useful to transmit data between extensions. HOOKCOM enables such communication, containing data that is shared between extensions.

Hookcomm

This hash table contains information that extensions tied to different extension events can share. An extension may make data available to others that are subsequently invoked by creating name-value pairs in HOOKCOM. The following code illustrates how data is made available in this manner.

```
public class HookCommExtension extends SiteHook
{
public HookCommExtension(Hashtable params)
{
super(params);
```

}
public void action( ) throws Exception
{
  Hashtable MyHookComm=(Hashtable)getParamValue ("hookComm");
  MyHookComm.put("info", "Hello World!!!");
  setRetValue("HOOKCOMM", MyHookComm);
}
}

The above code defines a method named action. The action method creates a hash table object MyHookComm, and initializes it with values currently stored in the hash table HOOKCOM. Next, the action method adds as an entry a name-value pair, specifically, the action method adds as an entry the key "info" and the string "Hello World!". Then the method setRetValue is invoked, which establishes the data in MyHookComm as the hash table HOOKCOM.

Exceptions

In an embodiment of the present invention, extensions are developed so that error conditions are handled as exceptions. Extensions should be designed so the exceptions are caught and thrown. Any of the functions or classes in, for example, Server API 404 or Access Control Library 410 may throw exceptions. Appendix Two shows examples of some of exceptions that may occur, and further explains them.

Hook Configuration Mapping

Figure 6:
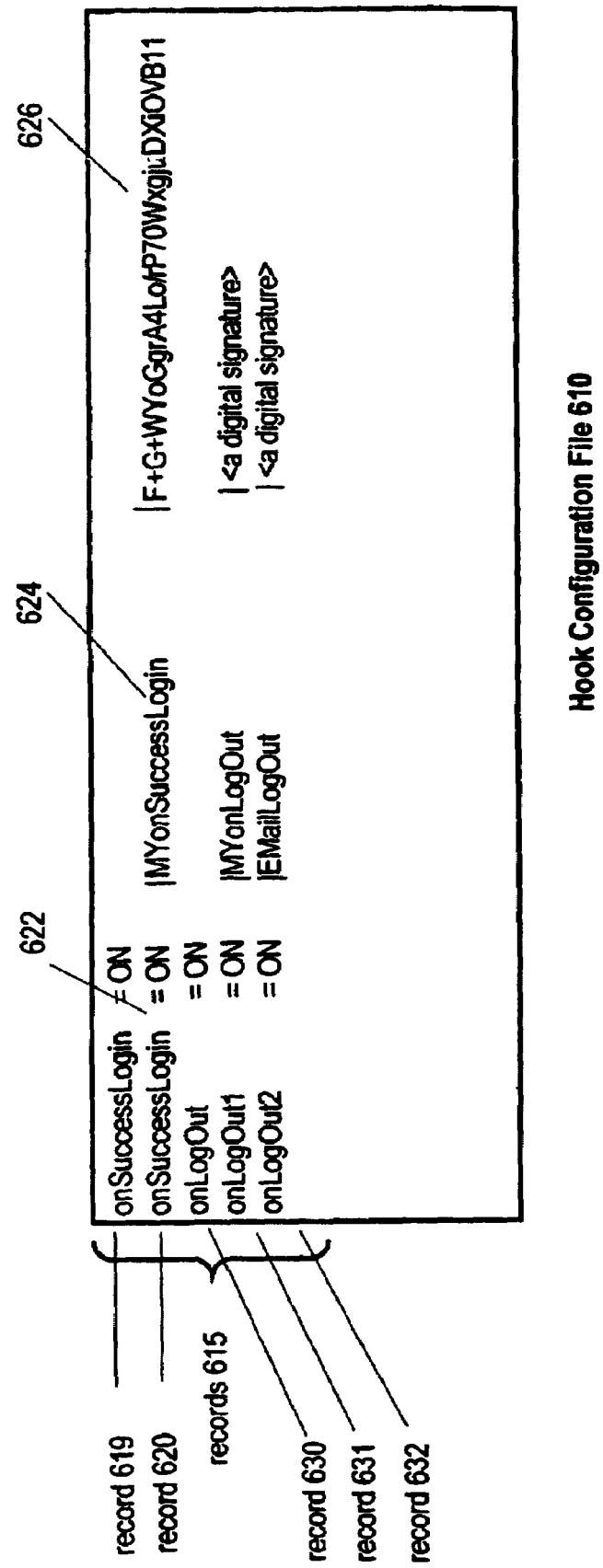
FIG. 6 is block diagram depicting a Hook Configuration mapping.

A Hook Configuration mapping specifies which access control events are extensions, and whether extension invocation is active for the extension event or any of the extensions tied to the extension event. FIG. 6 shows a Hook Configuration mapping in the form of Hook Configuration file 610. Hook Configuration file 610 contains set of records 615, which includes records 619, 620, 630, 631, and 632.

Record 619 specifies that an access control event is an extension event, and in particular, that on SuccessLogin is an extension event. Record 619 has the following format.

Extension Event Name=ON|OFF

The string 'ON|OFF' is a switch which may be set to the string 'ON' or 'OFF". When set to 'ON", the switch specifies that extension invocation is active for the extension event.

Record 620 maps an extension to an extension event and a signature. Record 620 has the following format.

Extension Event Name/Order of Execution=ON|OFF | Extension Class Name | Extension Signature The name of the extension event to which an extension is tied is appended to a numeric string specifying the order of execution. Extension Class Name is the name of extension in the form of the name of a class that may loaded and executed. The string 'ON|OFF' is a switch which may be set to the string 'ON' or 'OFF". When set to 'ON", the switch specifies that extension invocation is active for the extension, that is, the extension class mapped to the extension event is called upon the occurrence of the extension event.

Record 630 specifies that on LogOut is an extension event. Record 631 specifies that the first extension to execute upon the occurrence of on LogOut is class MyonLogOut. Record 632 specifies that the second to execute is EMail-LogOut.

Implementing Extensions

Figure 7:
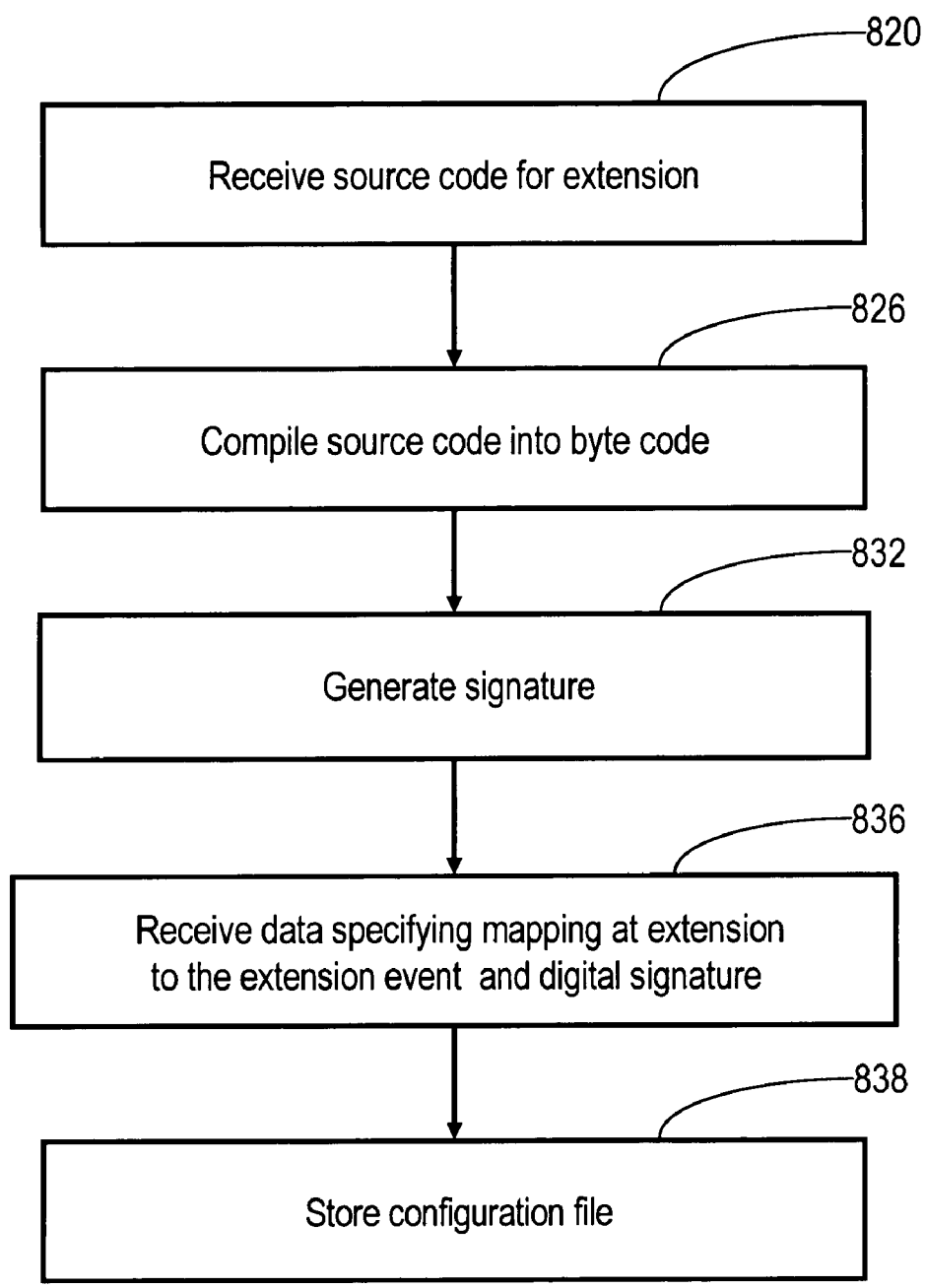
FIG. 7 is a flow chart showing the steps for developing extensions and configuring an access control mechanism system to securely invoke the extensions.

FIG. 7 shows a flow chart showing a technique for implementing extensions according to an embodiment of the present invention. The technique involves developing extensions as subclasses that inherit from SiteHook class 344, generating a signature for the class, and storing data mapping the extension to the signature and an extension event. The steps are illustrated using an example based on Hook Configuration File 610 and exemplary source code for the extension MyOnSuccessLogin shown below.

```
public class MyonSuccessLogin extends SiteHook
(
public MyonSuccessLogin (Hashtable params)
(
    super (paranms);
)
public void action( ) throws Exception
(
    String username = (String)get ParamValue("userName");
    String GARoot = getAccessRoot( ).trim( );
    String configFile = "config/connection.conf";
    Hashtable cookies = new Hashtable( );
    // if no username is provided, then return
    if(username == null && username.length( ) < 1)
        return;
    // setup the path to get the connection information
    if(GARoot.charAt(GARoot.length( ) -1) == '/'||
        GARoot.charAt(GARoot.length( ) -1) == '\\')
        configFile = GARoot + configFile;
    else
        configFile = GARoot + "/" + configFile;
    try
    (
        // establish connection to getAccess
        enCommConnection db = new
enCommConnection(configFile);
        // ready to create a UserAPI instance
        enCommUserAPI userAPI = new enCommUserAPI(db);
        // get the person id for the current user and
        // get the user plus information
        String personID = userAPI.getPersonID(username);
        Hashtable ht = userAPI.getUserPlus(personID);
        // Getting the information from the user plus table
        String memNum = (String)ht.get("CHAR1");
        String rpin = (String)ht.get("CHAR2");
        // Assign the information to the following cookie names
        cookies.put("MEM_NUM, memNum);
        cookies.put("RPIN", rpin);
        // Return the cookies to the caller
        setRetValue("COOKIES", cookies);
    )
    catch(Exception e)
    (
        throw e;
    )
)
)
```

At block 820, source code for an extension is received. In this example, the source code shown above is received. The source code implements class MYonSuccessLogin 624. Note that MYonSuccessLogin defines a method named action. MYonSuccessLogin also invokes method setRetValue.

At block 826, the received source code is compiled, if necessary. In this example, the received source code is compiled using commercially available Java compilers.

At block 832, a signature is generated for the just compiled class. In this example, the signature is generated by invoking class HookSigner 342 and passing parameters values identifying the class for which to generate a signature and a password supplied by an administrator of system 2.

The following is a sample command that invokes Hook-Signer 342 to generate a signature for class MYonSuccess-Login 624.

java HookSigner MyonSuccessLoginExtension.class password HookSigner returns the following signature after being invoked.

F+G+WYoGgrA4Lo/rP70WxgjuDXiOVB11

At block 836, mapping data is received that maps an extension event to an extension and the extension to a signature. In this example, administration application 114 receives the following delimited string from an administrator of systems2.

on SucessLogin=ON | MYonSuccessLogin |
    F+G+WYoGgrA4Lo/rP70WxgjuDXiOVB11

At block 838, the mapping data is stored. In this example, the mapping data is stored in Hook Configuration file 610 as record 620.

Securely Invoking Extensions

Figure 8:
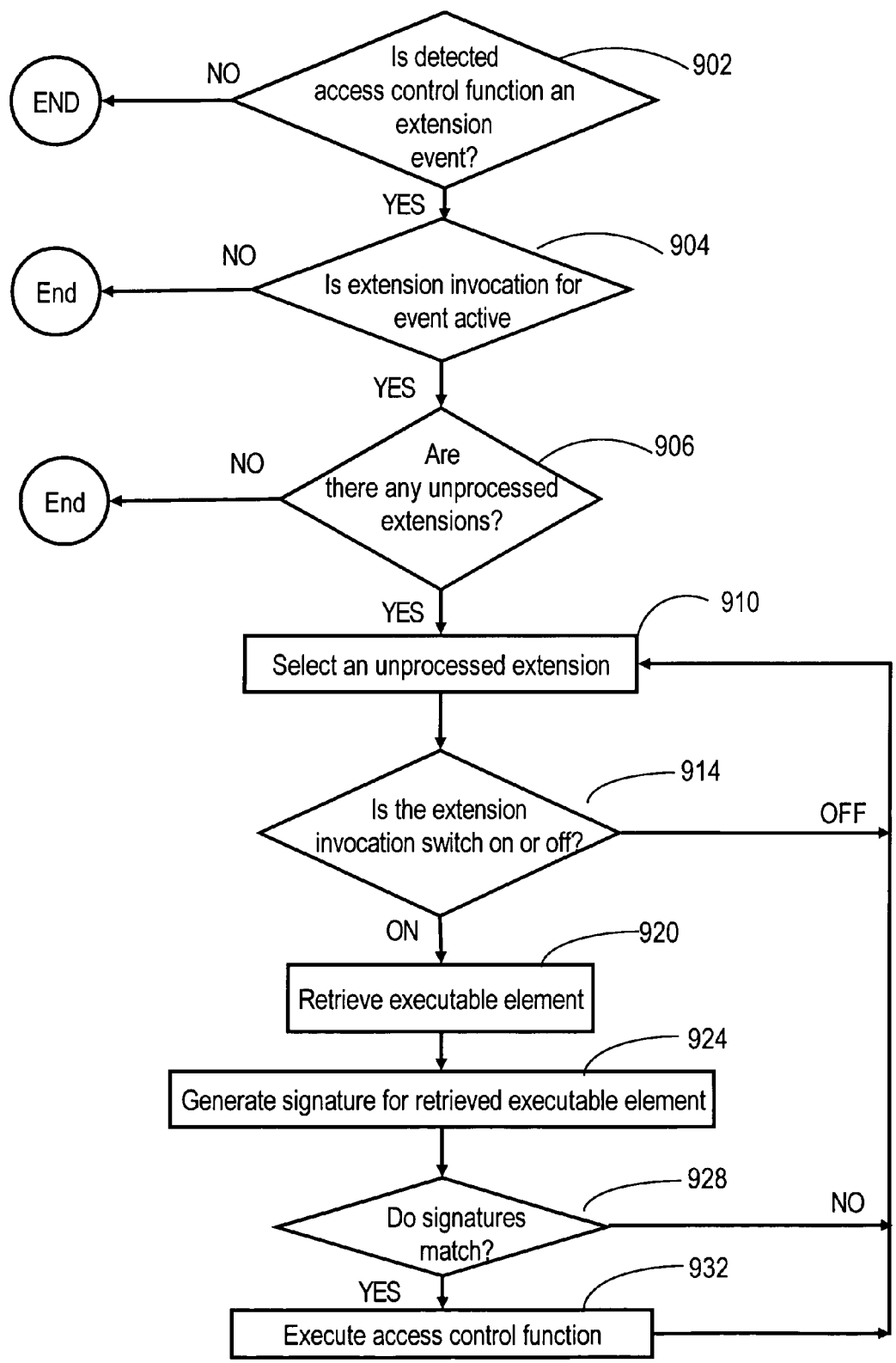
FIG. 8 is a flow chart showing the steps of securely executing an extension.

FIG. 8 depicts a method for securely invoking an extension. The blocks are performed when system 2 detects the occurrence of an extension event. The method depicted in FIG. 8 is illustrated using Hook Configuration File 610 and FIG. 5B, the process for login tracking. Because data in Hook Configuration File 610 is used to securely invoke an extension, Hook Configuration File 610 is loaded into memory when any component of system 2 that accesses the file initializes itself to begin running. The file is loaded into memory upon the runtime initialization of any component of system 2 that invokes the blocks of FIG. 8.

For purposes of illustration, access server 106 has determined that a user is authentic, and has thus detected the on SuccessLogin event. At block 517, Access Server 106 begins the process for securely invoking extensions for the on SuccessLogin event.

At block 902, access server 106 determines whether the detected access control function is an extension event. If the access control function is an extension event, control passes to block 904. Otherwise, execution of the blocks ceases. In this example, the records from the Hook Configuration file 610 are examined to determine whether any record specifies that OnSuccessLogin is an extension. Because record 619 specifies that OnSuccessLogin is an extension event, control flows to block 904.

At block 904, it is determined whether extension invocation for the extension is active. If extension invocation is active, control flows to block 906. Otherwise, execution of the blocks in FIG. 8 ends. In the current example, record 619 indicates that extension invocation for on SuccessLogin is active, control therefore flows to block 906.

At block 906, it is determined whether there are any unprocessed extensions. An unprocessed extension is an extension mapped to the detected extension event which has not been selected at block 910 in the current invocation of the process depicted in FIG. 8. If there are unprocessed extensions, execution of the blocks flows to block 910. Otherwise, execution of the blocks ceases. In this example, no mapped extension has been selected. Therefore, execution of the blocks flows to block 910.

At block 910, an unprocessed extension is selected, in the order specified by Hook Configuration File 610. In this example, the extension MYonSuccessLogin is selected.

At block 914, it is determined whether extension invocation for the selected extension is active. If so, then control passes to block 920. Otherwise, control returns to block 906.

In this example, record 620 indicates that extension invocation for MYonSuccessLogin is active. Therefore, control flows to block 920.

At block 920, the executable element for the selected extension is retrieved. In this example, class MYonSuccess-Login is retrieved.

At block 924, a signature for the retrieved executable element is generated. In this example, the signature generated is:

F+G+WYoGgrA4Lo/rP70WxgjuDXiOVB11

At block 928, it is determined whether the just generated signature matches the signature mapped to the selected extension. If not, control passes to block 906. Otherwise, the extension is executed at block 932, and then control returns to block 906.

Hardware Overview

Figure 9:
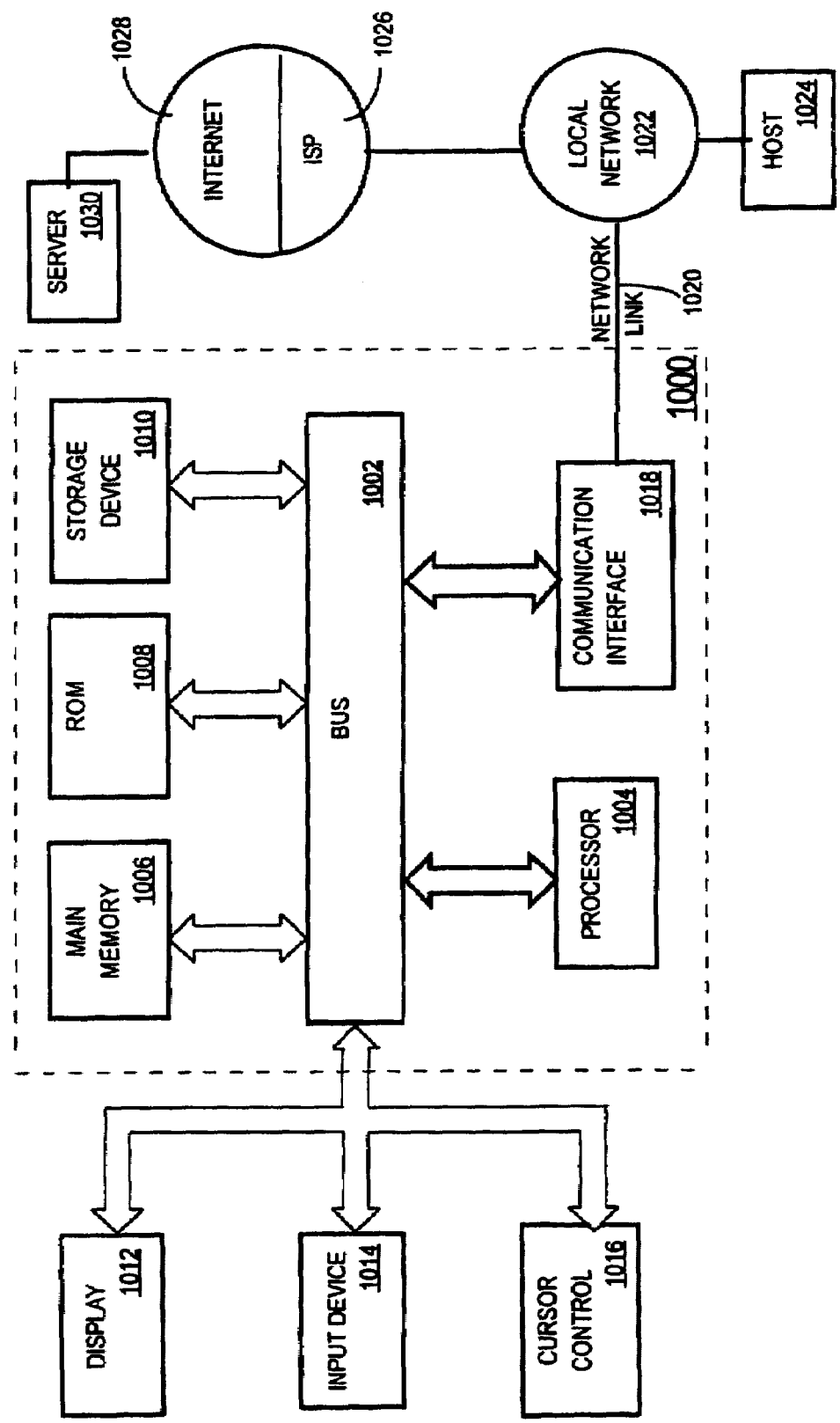
FIG. 9 is a computer system upon which an embodiment of the present invention may be implemented.

FIG. 9 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for controlling access to protected information resources. According to one embodiment of the invention, controlling access to protected information resources is provided by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process blocks described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for controlling access to protected information resources as described herein.

The received code may be executed by processor 1004 as it is received, and/or stored in storage device 1010, or other non-volatile storage for later execution. In this manner, computer system 1000 may obtain application code in the form of a carrier wave.

Appendix 1—Access Control Library Public API

Extension Event: on BeforeVerify

Default Behavior: Occurs when the getAccess login screen displays.

Parameters: userName, userHost, userBrowser, referPage, serverURL, hookComm, loginPolicy, userLocale Returns: HOOKCOMM (optional)

Example Usage: Tie an extension to this event to initialize code, read or write files, or connect to another system.

Extension Event: on VerifyLogin

Default Behavior: Occurs when a user clicks Login after entering a username and password.

Parameters: userName, userHost, userBrowser, formData, referPage, serverURL, hookComm, loginPolicy, userLocale, userPassword, userCert, verifyPolicy Returns: SPECIALIZED_FIELDS: SKIPGETACCESSAUTH, GETACCESSUSERNAME, HOOKCOMM (optional)

Example Usage: Tie an extension to this event to override the default authentication process and use information from another server to verify a user's privileges.

Extension Event: on FailLogin

Default Behavior: Occurs when there's no match for a user's login and password in the Authentication Server database.

Parameters: userName, userHost, userBrowser, referPage, serverURL, hookComm, loginPolicy, userLocale Returns: COOKIES, HOOKCOMM (optional)

Example Usage: Tie an extension to this event to send a cookie to the user's browser that displays an alert message, or to write a message describing the failure and automatically e-mail it to a specified individual.

Extension Event: on ShowFailLogin

Default Behavior: Occurs when an error screen displays after a user attempts to log in unsuccessfully.

Parameters: userName, userHost, userBrowser, referPage, serverURL, hookComm, loginPolicy, userLocale Returns: SPECIALIZED_FIELDS: URL, HOOKCOMM (optional)

Example Usage: Tie an extension to this event to redirect a user to another URL after an unsuccessful login attempt, either to allow login to a different server or to report a forgotten password.

Extension Event: on SuccessLogin

Default Behavior: Occurs when a user logs in successfully. Triggers recording of the date, time, and host server of the user's successful login and storage of the information in a cookie.

Parameters: userName, userHost, userBrowser, referPage, serverURL, hookComm, loginPolicy, userLocale, attemptsInfo Returns: COOKIES, SPECIALIZED_FIELDS: MESSAGE, SECURE_COOKIES, HOOKCOMM (optional)

Example Usage: Tie an extension to this event to record a custom message in the cookie, for instance, adding a password-expiration or stock-purchase plan message to a user's previous login data.

Extension Event: on ShowSuccessLogin

Default Behavior: Occurs when a user logs in successfully.

Parameters: userName, userHost, userBrowser, referPage, serverURL, hookComm, loginPolicy, userLocale, attemptsInfo Returns: SPECIALIZED_FIELDS: URL, HOOKCOMM (optional)

Example Usage: Tie an extension to this event to redirect a user to another URL after a successful login attempt.

Extension Event: onLogout

Default Behavior: Occurs when a user logs out.

Parameters: userName, userHost, userBrowser, referPage, serverURL, hookComm, userLocale Returns: COOKIES, HOOKCOMM (optional)

Example Usage: Tie an extension to this event to destroy a cookie when a user logs out, or to send a custom message to the user.

Extension Event: on AddCertificate

Default Behavior: Occurs when a user self-registers a digital certificate.

Parameters: userName, userHost, userBrowser, referPage, serverURL, hookComm, loginPolicy, userLocale, userPassword, userCert, verifyPolicy Returns: SPECIALIZED_FIELDS: SKIPGETACCESSADDCERT, HOOKCOMM (optional)

Example Usage: Tie this event to an extension to store the digital certificate in a Registry Repository on an alternate server.

Extension Event: onBeforeChangeProfile

Default Behavior: Occurs when a user clicks Change Profile in the getAccess Client.

Parameters: userName, userHost, userBrowser, referPage, serverURL, hookComm, userLocale Returns: HOOKCOMM (optional)

Example Usage: Tie this event to an extension to initialize code, connect to an external database, or open files.

Extension Event: on ChangeProfile

Default Behavior: Occurs when a user updates his or her profile.

Parameters: userName, userHost, userBrowser, referPage, serverURL, hookComm, loginPolicy, userLocale, userTimeZone, userDateCode, userNewPassword (if any)

Returns: SPECIALIZED_FIELDS: SKIPGETACCESSPROFILING, HOOKCOMM (optional)

Example Usage: Tie this event to an extension to update profile information stored on alternate servers, or to add custom fields such as name and address data.

Extension Event: onFailChangeProfile

Default Behavior: Occurs when a user unsuccessfully attempts to change his or her profile.

Parameters: userName, userHost, userBrowser, referPage, serverURL, hookComm, userLocale Returns: COOKIES, HOOKCOMM (optional)

Example Usage: Tie this event to an extension to send a cookie to the browser that displays a custom error message.

Extension Event: onShowFailChangeProfile

Default Behavior: Occurs when a screen showing an error message displays after a user unsuccessfully attempts to change his or her profile.

Parameters: userName, userHost, userBrowser, referPage, serverURL, hookComm, userLocale Returns: URL, HOOKCOMM (optional)

Example Usage: Tie this event to an extension to redirect the user to a different URL before or after the error-message screen displays.

Extension Event: onSuccessChangeProfile

Default Behavior: Occurs when a user successfully changes his or her profile.

Parameters: userName, userHost, userBrowser, referPage, serverURL, hookComm, userLocale Returns: COOKIES, HOOKCOMM (optional)

Example Usage: Tie this event to an extension to send a cookie to the browser that displays a custom update-confirmation message.

Extension Event: onShowSuccessChangeProfile

Default Behavior: Occurs when a screen showing an update-confirmation message appears after a user successfully changes his or her profile.

Parameters: userName, userHost, userBrowser, referPage, serverURL, hookComm, userLocale Returns: SPECIALIZED_FIELDS: URL, HOOKCOMM (optional)

Example Usage: Tie this event to an extension to redirect the user to another URL that displays a custom message.

Extension Event: onBeforeChangePassword

Default Behavior: Occurs when a user clicks Change Profile in the getAccess Client.

Parameters: userName, userHost, userBrowser, referPage, serverURL, hookComm, userLocale Returns: HOOKCOMM (optional)

Example Usage: Tie this event to an extension to initialize code, connect to an external database, or open files.

Extension Event: onChangePassword

Default Behavior: Occurs when a user updates his or her profile. Triggers updating of the user profile information in the Registry Repository.

Parameters: userName, userHost, userBrowser, referPage, serverURL, hookComm, formData, loginPolicy, userLocale, userTimeZone, userDateCode, userNewPassword(if any)

Returns: SPECIALIZED_FIELDS: SKIPGETACCESSPASSWORD, GETACCESSUSERNAME, HOOKCOMM (optional)

Example Usage: Tie this event to an extension to update profile information stored on alternate servers, or to add custom fields such as name and address data.

Extension Event: onFailChangePassword

Default Behavior: Occurs when a user unsuccessfully attempts to change his or her profile.

Parameters: userName, userHost, userBrowser, referPage, serverURL, hookComm, userLocale Returns: COOKIES, HOOKCOMM (optional)

Example Usage: Tie this event to an extension to send a cookie to the browser that displays a custom error message.

Extension Event: onShowFailChangePassword

Default Behavior: Occurs when a screen showing an error message displays after a user unsuccessfully attempts to change his or her profile.

Parameters: userName, userHost, userBrowser, referPage, serverURL, hookComm, userLocale Returns: URL, HOOKCOMM (optional)

Example Usage: Tie this event to an extension to redirect the user to a different URL before or after the error-message screen displays.

Extension Event: onSuccessChangePassword

Default Behavior: Occurs when a user successfully changes his or her profile.

Parameters: userName, userHost, userBrowser, referPage, serverURL, hookComm, userLocale Returns: COOKIES, HOOKCOMM (optional)

Example Usage: Tie this event to an extension to send a cookie to the browser that displays a custom update-confirmation message.

Extension Event: onShowSuccessChangePassword

Default Behavior: Occurs when a screen showing an update-confirmation message appears after a user successfully changes his or her profile.

Parameters: userName, userHost, userBrowser, referPage, serverURL, hookComm, userLocale Returns: SPECIALIZED_FIELDS: URL, HOOKCOMM (optional)

Example Usage: Tie this event to an extension to redirect the user to another URL that displays a custom message.

Extension Event: onAddCertificateMgmt

Default Behavior: Occurs when an administrator registers a user's digital certificate.

Parameters: userName, userHost, userBrowser, referPage, serverURL, userLocale, userCert Returns: SPECIALIZED_FIELDS: SKIPGETACCESSADDCERT, HOOKCOMM (optional)

Example Usage: Tie this event to an extension to add newly-registered digital certificates to an alternate Registry Repository on a different server. (To accomplish this particular task, you must override the on VerifyLogin event.)

Extension Event: onDeleteCertificateMgmt

Default Behavior: Occurs when an administrator deletes a user's digital certificate. Parameters: userName, userHost, userBrowser, referPage, serverURL, hookComm, userLocale, certSerial Returns: SPECIALIZED_FIELDS: SKIPGETACCESSDELETECERT, HOOKCOMM (optional)

Example Usage: Tie this even to an extension to delete digital certificates from an alternate Registry Repository on a different server. (To accomplish this particular task, you must override the on VerifyLogin event.)

Appendix 2—Exception Handling

Design your extensions to throw exceptions when both explainable and unidentifiable errors occur. The exceptions trigger the display of the following error messages to the user:
  Event: onVerifyLogin
  InvalidUserException=The user and password are not valid.
  InactiveAccountException=The user is inactive.
  PasswordExpiredException=The user's password has expired.
  CANotTrustedException=The CA is not a trusted CA.
  InvalidParameterException=The user does not exist in the system.
  Exception=Something unexplainable happened in the extension. Proceed with getAccess execution.
  OtherException=Stops getAccess execution and displays a system error.
  Event: onAddCertificate
  CANotTrustedException=The CA is not a trusted CA.
  Exception=Something unexplainable happened in the extension. Proceed with getAccess execution.
  OtherException=Stops getAccess execution and displays a system error.
  Event: onChangeProfile
  InvalidUserException=The user and password are not valid.
  InvalidParameterException=The user does not exist in the system.
  InactiveAccountException=The user is inactive.
  PasswordExpiredException=The user's password has expired.

Exception=Something unexplainable happened in the extension. Proceed with getAccess execution.
OtherException=Stops getAccess execution and displays a system error.
Event: onChangePassword
InvalidUserException=The user and password are not valid.
InvalidParameterException=The user does not exist in the system.
InactiveAccountException=The user is inactive.
Exception=Something unexplainable happened in the extension. Proceed with getAccess execution.
OtherException=Stops getAccess execution and displays a system error.
Event: onAddCertificateMgmt
PrimaryKeyException=Certificate already exists.
DuplicatedRowsException=Duplicate data already exist.
Exception=Something unexplainable happened in the extension. Proceed with getAccess execution
OtherException=Stops getAccess execution and displays a system error.
Event: All Events
OtherException=Stops getAccess execution and displays a system error.

What is claimed is:

1. A method of securely invoking an access control function, the method comprising the steps of:
   receiving a digital signature for the access control function;
   generating a mapping of the access control function to the digital signature;
   determining that the digital signature is mapped to the access control function based on the mapping when execution of the access control function is requested;
   generating a plurality of records mapping access control events to access control functions along with an indication whether access control function invocation is active for each mapped access control event wherein said plurality of records are stored in a configuration file;
   detecting that an access control event related to controlling access to information resources on a computer system has occurred;
   determining that the access control event is mapped to the access control function;
   retrieving an executable element if the access control event is mapped to the access control function and if access control function invocation is active for the access control event;
   generating a digital signature for the retrieved executable element;
   determining whether the retrieved executable element matches the access control function by comparing the digital signature of the retrieved executable element and the digital signature for the access control function; and
   executing the retrieved executable element only when the retrieved executable element matches the access control function.

2. The method of claim 1,
   wherein a particular class defines an implementation of the access control function;
   wherein the step of receiving a digital signature includes the step of receiving a digital signature for the particular class; and
   wherein the step of generating a mapping includes generating a mapping between the particular class and the digital signature.

3. The method of claim 1, wherein the step of returning data further includes the executable element returning name-value pairs.

4. The method of claim 1, wherein the step of returning data includes the executable element returning a hash table that contains the name-value pairs.

5. The method of claim 1, wherein the method further includes the steps of:
   generating a mapping of a plurality of access control functions to digital signatures, wherein the plurality of access control functions include the access control function, wherein one or more classes define an implementation for each of the plurality of access control functions; and
   wherein each of the one or more classes belong to a superclass.

6. The method of claim 5, further including the step of invoking a routine defined by a superclass that collects data to return to a caller of the particular class.

7. The method of claim 6, wherein the step of executing the executable element includes invoking a routine defined for the superclass.

8. The method of claim 1, wherein the step of retrieving an executable element includes retrieving byte code.

9. The method of claim 8, wherein the step of retrieving byte code includes retrieving Java byte code.

10. The method of claim 1, wherein the step of retrieving an executable element includes a first computer system retrieving byte code transmitted via a local area network from a second computer system.

11. An access control system, comprising:
    a processor;
    a memory coupled to the processor;
    a first mapping that maps each of a set of access control functions to a digital signature of that access control function;
    the processor configured to retrieve an executable element in response to a request to execute a first access control function;
    the processor configured to generate a plurality of records mapping access control events to access control functions along with an indication whether access control function invocation is active for each mapped access control event wherein said plurality of records are stored in a configuration file;
    the processor configured to detect that an access control event related to controlling access to information resources on a computer system has occurred;
    the processor configured to determine that the access control event is mapped to the access control function;
    the processor configured to retrieve an executable element if the access control event is mapped to the access control function and if access control function invocation is active for the access control event;
    the processor configured to generate a digital signature for the retrieved executable element;
    the processor configured to determine whether the retrieved executable element matches the first access control function by comparing the digital signature of the retrieved executable element and the digital signature for the first access control function; and
    the processor configured to execute the retrieved executable element when the retrieved executable element matches the first access control function.

12. The access control system of claim 11,
wherein the first mapping maps a class implementing one of the set of access control functions to a digital signature.

13. The access control system of claim 11, wherein the executable element returns name-value pairs as data.

14. The access control system of claim 11, wherein the executable element returns a hash table as data that contains the name-value pairs.

15. The access control system of claim 11,
wherein the processor is configured to generate a mapping of a plurality of access control functions to digital signatures;
wherein the plurality of access control functions include the access control function, wherein one or more classes define an implementation for each of the plurality of access control functions; and
wherein each of the one or more classes belong to a superclass.

16. The access control system of claim 15, further comprising said processor configured to invoke a routine defined by a superclass that collects data to return to a caller of the particular class.

17. The access control system of claim 16, wherein said processor is configured to execute the executable element by invoking a routine defined for the superclass.

18. The access control system of claim 17, wherein said executable element is byte code.

19. The access control system of claim 18, wherein said byte code includes Java byte code.

20. The access control system of claim 19, wherein said processor is configure to retrieve an executable element by retrieving byte code transmitted via a local area network.

21. A computer-readable medium carrying one or more sequences of one or more instructions for securely invoking an access control function, the one or more sequences of one or more instructions including instructions which, when executed by one or more processors, cause the one or more processors to perform the steps of:
receiving a digital signature for the access control function;
generating a mapping of the access control function to the digital signature;
determining that the digital signature is mapped to the access control function based on the mapping when execution of the access control function is requested;
generating a plurality of records mapping access control events to access control functions along with an indication whether access control function invocation is active for each mapped access control event wherein said plurality of records are stored in a configuration file;
detecting that an access control event related to controlling access to information resources on a computer system has occurred;
determining that the access control event is mapped to the access control function;
retrieving an executable element if the access control event is mapped to the access control function and if access control function invocation is active for the access control event;
generating a digital signature for the retrieved executable element;
determining whether the retrieved executable element matches the access control function by comparing the digital signature of the retrieved executable element and the digital signature for the access control function; and
executing the retrieved executable element only when the retrieved executable element matches the access control function.

22. The computer-readable medium of claim 21,
wherein a particular class defines an implementation of the access control function;
wherein the step of receiving a digital signature includes the step of receiving a digital signature for the particular class; and
wherein the step of generating a mapping includes generating a mapping between the particular class and the digital signature.

23. The computer-readable medium of claim 21, wherein the step of returning data further includes sequences of instructions for performing the step of the executable element returning name-value pairs.

24. The computer-readable medium of claim 21, wherein the step of returning data includes the executable element returning a hash table that contains the name-value pairs.

25. The computer-readable medium of claim 21, wherein the computer-readable medium further includes sequences of instructions for performing the steps of:
generating a mapping of a plurality of access control functions to digital signatures, wherein the plurality of access control functions include the access control function, wherein one or more classes define an implementation for each of the plurality of access control functions; and
wherein each of the one or more classes belong to a superclass.

26. The computer-readable medium of claim 25, further including sequences of instructions for performing the step of invoking a routine defined by a superclass that collects data to return to a caller of the particular class.

27. The computer-readable medium of claim 26, wherein the step of executing the executable element includes invoking a routine defined for the superclass.

28. The computer-readable medium of claim 21, wherein the step of retrieving an executable element includes retrieving byte code.

29. The computer-readable medium of claim 28, wherein the step of retrieving byte code includes retrieving Java byte code.

30. The computer-readable medium of claim 21, wherein the step of retrieving an executable element includes a first computer system retrieving byte code transmitted via a local area network from a second computer system.

* * * * *

UNITED STATES PATENT AND TRADEMARK OFFICE
CERTIFICATE OF CORRECTION

| | | |
|---|---|---|
| PATENT NO. | : 7,155,737 B1 | Page 1 of 1 |
| APPLICATION NO. | : 09/309360 | |
| DATED | : May 11, 1999 | |
| INVENTOR(S) | : Mario Lim et al. | |

It is certified that error appears in the above-identified patent and that said Letters Patent is hereby corrected as shown below:

Title page, item (56) References Cited
      U.S. PATENT DOCUMENTS

Insert:

| | | | | |
|---|---|---|---|---|
| --5,757,914 A | * | 5/1998 | McManis | 713/187 |
| 6,161,139 A | * | 12/2000 | Win et al. | 709/225 |
| 6,606,711 B2 | * | 8/2003 | Andrews et al. | 713/201 |
| 6,351,813 B1 | * | 2/2002 | Mooney et al. | 713/185 |
| 6,289,458 B1 | * | 9/2001 | Garg et al. | 713/200 |
| 6,256,734 B1 | * | 7/2001 | Blaze et al. | 713/157 |
| 5,220,604 A | * | 6/1993 | Gasser et al. | 707/9 |
| 6,412,070 B1 | * | 6/2002 | Van Dyke et al. | 713/200 |
| 6,182,142 B1 | * | 1/2001 | Win et al. | 709/229-- |

Signed and Sealed this

Seventeenth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO.       : 7,155,737 B1                                    Page 1 of 1
APPLICATION NO.  : 09/309360
DATED            : December 26, 2006
INVENTOR(S)      : Mario Lim et al.

It is certified that error appears in the above-identified patent and that said Letters Patent is hereby corrected as shown below:

Title page, item (56) References Cited
    U.S. PATENT DOCUMENTS

Insert:

| | | | |
|---|---|---|---|
| --5,757,914 A | * | 5/1998 | McManis ................... 713/187 |
| 6,161,139 A | * | 12/2000 | Win et al. ................... 709/225 |
| 6,606,711 B2 | * | 8/2003 | Andrews et al. ........................... 713/201 |
| 6,351,813 B1 | * | 2/2002 | Mooney et al. ............................. 713/185 |
| 6,289,458 B1 | * | 9/2001 | Garg et al. ................................. 713/200 |
| 6,256,734 B1 | * | 7/2001 | Blaze et al. ................................. 713/157 |
| 5,220,604 A | * | 6/1993 | Gasser et al. ............................... 707/9 |
| 6,412,070 B1 | * | 6/2002 | Van Dyke et al. ......................... 713/200 |
| 6,182,142 B1 | * | 1/2001 | Win et al. ................................... 709/229-- |

This certificate supersedes the Certificate of Correction issued March 17, 2009.

Signed and Sealed this

Seventh Day of April, 2009

JOHN DOLL
*Acting Director of the United States Patent and Trademark Office*